Patented Aug. 8, 1950

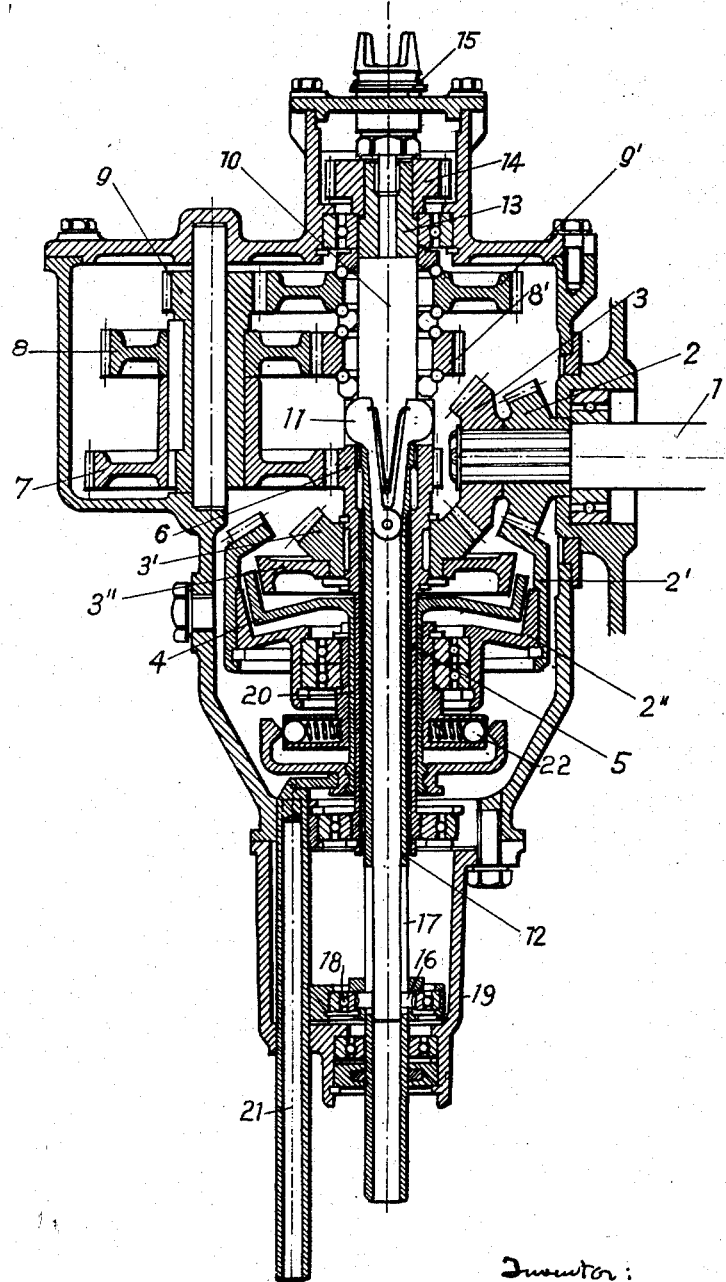

2,517,769

UNITED STATES PATENT OFFICE 2,517,769

CHANGE-SPEED MECHANISM WITH PERMANENTLY MESHING GEAR WHEELS

Louis Debuit, Grenoble, France

Application February 1, 1947, Serial No. 725,877
In France February 14, 1946

4 Claims. (Cl. 74—745)

This invention relates to change speed gearings.

Change speed gearings are known which are of the type comprising a driving shaft having a pair of driving pinions arranged on the driving shaft in constant mesh with driven pinions rotatably mounted on the driven shaft and alternatively coupled with said driven shaft.

Also known are change speed gearings of the type comprising a gear cone mounted on a counter shaft parallel to the driven shaft and driven by the driving shaft, and further comprising a plurality of gear sections in constant mesh with respective gears, rotatably mounted on the driven shaft and a shiftable clutch key permitting the selective engagement of the idle gears with the driven shaft.

The object of this invention is to provide a change speed gearing combining both types of said change speed gearings and permitting to multiply the selective possibilities of the one with the selective possibilities of the other one.

In fact, the invention will be understood more completely by reference to the appended drawing which is given for the purpose of exemplification and by no means of limitation.

The drawing is a sectional view of one embodiment of this invention which is particularly applicable to vehicles with driving fore and hind wheels. Of course, this invention is also applicable for many other purposes, notably in vehicles with one single driving wheel set, machine tools, etc., involving in each particular case modifications in the shapes, arrangements and sizes that can be made within the scope of the invention.

Referring now to the drawing, I designates the driving shaft on which the bevel gears 2 and 3 are secured rigidly. Said gears are in permanent meshing engagement with a pair of specially shaped bevel gears 2' and 3' made integral with clutch plates 2" and 3" respectively. Since said clutch plates are rotatably mounted on sleeve 5, it will be appreciated that they rotate independently at unequal speeds. Arranged between said clutch plates is an intermediate sliding plate 4 adapted to provide for the driving by either clutch plate of the hollow transmission shaft or sleeve 5 circumferentially rigid with said sliding plate 4. Carried at one end of said hollow transmission shaft or sleeve is a pinion 6 which is in permanent meshing engagement with a gear wheel 7. The latter consequently may be driven at two different speeds depending on which clutch plate is engaged by the sliding intermediate plate 4.

The sliding plate 4 is actuated through the sleeve 20 by means of the control lever 21. In 22 is represented a conventional ball device for controlling the two positions of the control lever 21.

The gear wheel 7 is rigid with an idle shaft that carried one or several other gear wheels, two of them in the present instance which are indicated at 8 and 9. Said gear wheels are in permanent meshing engagement with pinions 8' and 9' that are freely rotatable on the jack shaft 10 with which however they can be coupled separately e. g. with the side of one or several sliding clutch keys 11, the sliding movement of which is controlled by the sliding bar 12 and adapted to engage slots provided in the pinion hubs and in the sleeve 5 for direct drive, as represented in the drawing. The sliding bar is provided with a pin 16 sliding in a slot 17 in the driven shaft; pin 16 is made integral with the internal crown of a ball bearing 18, the external crown of which is made integral with a control lever not represented. By means of said control lever, the ball bearing 18 slides along the driven shaft in the housing 19".

It will be appreciated that depending on whether the clutch keys 11 are coupled with one of said pinions or the other the driven shaft 13 will be revolved at two unequal speeds; consequently, any particular rotational speed of the driving shaft can result in four different rotational speeds of the driven shaft since two different speeds are already available in the gear wheel set 7—8—9.

Besides, in direct drive conditions as shown in the drawing, two different speeds are also available for the driven shaft 10 and its extension 13, whereby as a whole six different gears are obtained.

Of course, the number of gears may be varied to suit particular requirements without departing from the scope of the invention.

The shaft 13 which carries a pinion 14 at the outer end thereof may be made, with the aid of an additional pinion (not shown) and a universal coupling 15, to drive a further driven shaft contrawise to the direction of rotation of the already mentioned shaft 10.

What I claim is:

1. In a change speed gearing, in combination a first change speed gearing constituted by a selective constant mesh gear train comprising a driving shaft having a pair of driving pinions, a hollow transmission shaft, a pair of driven pinions rotatably mounted on the transmission shaft and meshing with the selective pinions aforesaid, means for alternatively coupling said driven pinions with said transmission shaft, a second change speed gearing comprising said transmission shaft, a driven shaft coaxially arranged with said hollow transmission shaft, a countershaft parallel with said driven shaft, a gear cone on said countershaft comprising a plurality of gear sections, one of these sections meshing with a gear on the transmission shaft, and the other sections meshing with respective gears rotatable about the driven shaft, a shiftable clutch key within said driven shaft, and means for axially shifting said key for the selective clutch engagement of said key with the gears on said driven shaft and with the driven shaft, said shifting means being arranged partly in said hollow transmission shaft.

2. In a change speed gearing in combination a first change speed gearing constituted by a selective constant mesh gear train comprising a driving shaft having a pair of driving pinions, coaxial driven shafts extending transversely and constituted by a hollow transmission shaft and a driven shaft coaxially arranged with said hollow transmission shaft, a pair of driven pinions rotatably mounted about the transmission shaft and meshing with the respective pinions aforesaid, means for alternatively coupling said driven pinions with said transmission shaft, a second change speed gearing comprising said transmission shaft, a countershaft parallel with said driven shaft, a gear cone on said countershaft comprising a plurality of gear sections, one of those sections meshing with a gear on the transmission shaft, and the other sections meshing with respective gears rotatable about the driven shaft, a shiftable clutch key within said driven shaft and means for axially shifting said key for the selective clutch engagement of said keys with the gears on said driven shaft and with the driven shaft, said shifting means being arranged partly in said hollow transmission shaft.

3. In a change speed gearing in combination a first speed gearing constituted by a selective constant mesh gear train comprising a driving shaft having a pair of driving pinions, a hollow transmission shaft, a pair of driven pinions rotatably mounted on said transmission shaft and respectively made integral with two clutch plates, a sliding clutch plate between said clutch plates and made integral with a sliding non-rotatable sleeve on the transmission shaft, means for alternatively coupling said sliding clutch plate with the said two clutch plates, a second change speed gearing comprising said transmission shaft, a driven shaft coaxially arranged with said hollow transmission shaft, a countershaft parallel with said driven shaft, a gear cone on said countershaft comprising a plurality of gear sections, one of those gears meshing with a gear on the transmission shaft and the other sections meshing with respective gears rotatable about the driven shaft, a shiftable clutch key within said driven shaft and means for axially shifting said key for selective engagement of said key with the gears on said driven shaft, said shifting means being arranged partly in said hollow transmission shaft.

4. In a change speed gearing in combination a first change speed gearing constituted by a selective constant mesh gear train comprising a driving shaft having a pair of driving pinions, a hollow transmission shaft, a pair of driven pinions rotatably mounted about said transmission shaft and meshing with the respective pinions aforesaid, means for alternatively coupling said driven pinions with said transmission shaft, a second change speed gearing comprising said transmission shaft, a driven shaft coaxial with said transmission shaft, a countershaft parallel with said driven shaft, a gear cone on said countershaft, comprising a plurality of gear sections, one of these sections meshing with a gear on the transmission shaft, and the other sections meshing with respective gears rotatable about the driven shaft, a shiftable clutch key within said driven shaft for selective clutch engagement with the gears on said driven shaft and directly with said driven shaft, and a sliding member located in said transmission shaft controlling said sliding key.

LOUIS DEBUIT.

REFERENCES CITED

The following references are of record in the file of this patent:

UNITED STATES PATENTS

| Number | Name | Date |
|---|---|---|
| 1,840,019 | Bressler | Jan. 5, 1932 |
| 1,954,302 | Van Roust | Apr. 10, 1934 |
| 2,086,809 | Kreis | July 13, 1937 |
| 2,372,376 | Hack | Mar. 27, 1945 |
| 2,444,691 | Barnes | July 6, 1948 |